Figure 1:
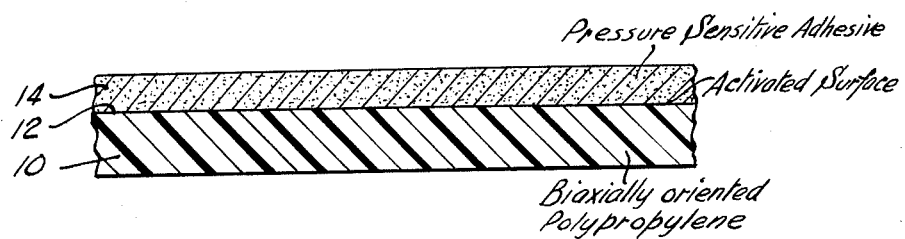

March 22, 1966  G. ROBINSON ET AL  3,241,662

BIAXIALLY ORIENTED POLYPROPYLENE TAPE BACKING

Filed June 22, 1962

INVENTORS:
GERALD ROBINSON
JEROME KRONFELD
BY
ATTORNEY

3,241,662
BIAXIALLY ORIENTED POLYPROPYLENE TAPE BACKING

Gerald Robinson, Somerset, and Jerome Kronfeld, Plainfield, N.J., assignors to Johnson & Johnson, a corporation of New Jersey
Filed June 22, 1962, Ser. No. 204,435
3 Claims. (Cl. 206—59)

This invention relates to a pressure-sensitive adhesive tape having a biaxially oriented, polypropylene backing and a pressure-sensitive adhesive firmly united to at least one major surface of said backing.

The term "polypropylene" as used herein and in the appended claims refers to and includes not only the homopolymer of propylene, but also the interpolymers of propylene and minor proportions of other monomers which may modify the properties of the polymer but do not change the essential characteristics displayed by the homopolymer which make it useful as a backing for a pressure-sensitive adhesive tape. Polypropylene films normally contain one or more stabilizers to improve the aging characteristics of the polymer, and it is such stabilized films which are referred to herein.

"Biaxially oriented" polypropylene films are generally obtained by stretching or drawing the film in two directions, which are at right angles in the major plane of the film, as for example in the longitudinal (machine) and transverse (cross-machine) direction. The stretching is usually conducted at elevated temperatures in the range of the crystalline melting point of the film. During stretching, the essentially unoriented film acquires a condition of molecular orientation and results in greatly enhanced tensile strength and improved optical clarity. The biaxial orientation can be done in a sequence of steps, i.e., first stretching the film in one direction and then in the other direction, or the orientation can be accomplished by simultaneously stretching the film in both directions. Various methods and apparatus have been described in the literature for accomplishing this orientation or tensilization of the film. The degree of orientation in each of the directions need not be the same. Usually the longitudinal direction orientation is greater than the transverse direction orientation.

It has been observed that biaxially oriented polypropylene possesses the proper balance of properties and characteristics to make it eminently suited as a backing for pressure-sensitive adhesive tapes. This balance of properties and characteristics includes:

(1) *Transparency.*—Films made from biaxially oriented polypropylene, unless fillers or coloring agents are added, are clear, transparent, and brilliant. In particular, the tapes made from the present backings in combination with the adhesives of the present invention are clearer or more transparent than other tapes previously known as "clear" tapes.

(2) *Age-resistance.*—Biaxially oriented polypropylene films do not discolor or embrittle upon aging.

(3) *Moisture-resistance.*—Biaxially oriented polypropylene films are not sensitive to moisture, are not hydrophilic and do not swell or degrade when in contact with moisture or when subjected to a hot, humid climate. The lack of moisture sensitivity permits the use of water-based adhesive systems, which are simpler, safer, and less expensive than the solvent based adhesive systems required, for example, on such backings as regenerated cellulose or cellophane.

(4) *Tear strength.*—Biaxially oriented polypropylene has a relatively high edge tear (i.e., is the resistant to initial edge cutting or nicking) but a relatively low cross tear thus permitting easy tearing when desired for dispensing. The ratio of edge tear to cross tear is preferably at least 10:1. The tear strength characteristics of biaxially oriented polypropylene give easy dispensing characteristics with the conventionally used devices employing a serrated edge cutter bar.

(5) *Elongation.*—Biaxially oriented polypropylene is sufficiently resistant to elongation to permit proper dispensing when wound in roll form. Generally, the backing should not stretch to a length greater than 1.6 times its original length, and preferably the backing should not stretch to a length greater than 1.4 times its original length.

(6) *Tensile strength.*—Biaxially oriented polypropylene film has a tensile strength greater than about 18 pounds per inch per mil thickness, thus enabling tapes made therefrom to be easily dispensed without tearing and breaking and to withstand the forces exerted during unwinding.

(7) *Solvent resistance.*—Biaxially oriented polypropylene films are resistant to the conventional solvents, such as toluene and heptane, used for applying pressure-sensitive adhesive compositions to backings.

(8) *Flexibility.*—Biaxially oriented polypropylene films possess the desired degree of flexibility without the addition of plasticizers which may migrate from the film to the pressure-sensitive adhesive mass and tend to degrade the adhesive.

(9) *Heat stability.*—Biaxially oriented polypropylene films are relatively heat stable and therefore can be processed at the temperatures encountered in coating and drying of pressure-sensitive adhesives.

(10) *Economics.*—Biaxially oriented polypropylene films are available at a price competitive with the film backing most widely used before, regenerated cellulose.

(11) *Modulus of five percent elongation.*—The modulus of 5 percent elongation, i.e., the force in pounds necessary to stretch the film having a cross-sectional area of one square inch to an elongation of 105 percent of its original length, should exceed 12,000 pounds in order to maintain dimensional stability during processing of the backing into an adhesive tape under normal manufacturing conditions. Biaxially oriented polypropylene has the required modulus of 5 percent elongation.

When used as a backing for a pressure-sensitive adhesive tape, the biaxially oriented polypropylene film generally may vary from about 0.5 to 3.0 mils in thickness, and preferably is from about 0.75 to 2.0 mils in thickness. If the backing is over about 3.0 mils in thickness, difficulties in tearing and dispensing will be encountered.

The major disadvantage encountered in the use of biaxially oriented polypropylene films as a backing for a pressure-sensitive adhesive tape is in securely and firmly uniting the pressure-sensitive adhesive mass composition to the surface of the film. In pressure-sensitive adhesive tape applications it is necessary to unite the adhesive mass preferentially to one surface of the backing so that when the tape is wound upon itself in roll form, and then unwound, the adhesive mass will not offset from the surface of the film backing to which applied onto the reverse or back surface of the film backing. Also, the adhesive mass must be firmly united to the backing so that the tape can be applied to a work surface and removed therefrom without delamination of the adhesive. The surface characteristics of polypropylene are such that it is difficult to anchor or adhere other materials to it. These difficulties are accentuated where the molecules have been oriented.

Various surface treatments of polyethylene film have been proposed to increase its anchorage capabilities. These treatments have included: (1) electrostatic processes, such as described in U.S.P. Nos. 2,715,075, 2,859,480, 2,864,756, and 3,018,189; (2) flame treatment, such as shown in U.S.P. Nos. 2,632,921, 2,648,097, and 2,683,894; and (3) chemical modification as by surface treatment with chromic acid or chlorosulfonic acid. However, the conventional pressure-sensitive adhesive will not adhere sufficiently well even to such treated surfaces of biaxially oriented polypropylene films. Nor will the conventional primers satisfactorily serve to anchor the standard pressure-sensitive adhesive formulations to the surface of biaxially oriented polypropylene films.

Surprisingly, it has been found that various interpolymers of an alkyl ester of an unsaturated acid such as acrylic, or methacrylic acid and one or more other monomers copolymerizable therewith, not only are themselves pressure-sensitive adhesives, (i.e., are normally tacky and have adequate internal cohesive strength), but also will firmly unite to a surface of a biaxially oriented polypropylene film which has been treated by any of the foregoing processes to make the surface more receptive to anchorage.

The interpolymers with which this invention are concerned may be prepared by aqueous emulsion or dispersion or organic solution techniques. Any of the alkyl esters of an unsaturated carboxylic acid such as acrylic or methacrylic acids, e.g., 2-ethylhexyl acrylate, octyl acrylate, decylacrylate and the like may be used in the interpolymers; although preferably the alkyl group should contain from 6 to 12 carbon atoms. The other monomers copolymerizable with said alkyl ester are vinyl esters of an aliphatic acid of less than 6 carbon atoms such as vinyl acetate, an unsaturated carboxylic acid such as acrylic acid, itaconic acid, maleic acid, fumaric acid, or methacrylic acid, vinyl phenyl compounds such as styrene, vinyl alkyl ethers such as vinyl ethyl ether, unsaturated aliphatic amides such as acrylamide, and mixtures of two or more of the foregoing comonomers. The alkyl ester should represent from about 55 to 95 percent by weight of the copolymer. The unsaturated carboxylic acid or unsaturated aliphatic amide component may represent up to about 12 percent of the copolymer by weight. The other monomers, if present, may be used in from about 45 to 5 percent by weight of the copolymer.

The preferred adhesive is one which is a terpolymer of (1) an alkyl ester of an unsaturated acid, e.g., 2-ethyl hexyl acrylate; (2) an unsaturated carboxylic acid, e.g., acrylic acid, maleic acid, fumaric acid; methacrylic acid, itaconic acid, ethacrylic acid; and (3) a vinylester of an aliphatic acid of less than six carbon atoms, e.g., vinyl acetate, vinyl butyrate; in which component (1) above represents from about 55-80 percent of the terpolymer, component (2) above represents from about 1-10 percent of the terpolymer and preferably fom about 2-8 percent of the terpolymer, and component (3) above represents the balance of the terpolymer.

The pressure-sensitive adhesive compositions described herein are particularly useful in combination with biaxially oriented polypropylene films treated to activate their surface because:

(a) Such adhesives firmly unite to the activated surface of biaxially oriented polypropylene without offsetting or transferring onto the backside of the film or onto surfaces to which applied, even without the use of a release agent or a primer coating.

(b) Such adhesives are compatible with biaxially oriented polypropylene films, i.e. they will not tend to degrade such films.

(c) Such adhesives are clear and transparent producing in combination with the biaxially oriented polypropylene film backing a transparent, optically clear tape.

(d) Such adhesives are stable, neither losing tack nor discoloring on aging.

A typical pressure-sensitive adhesive tape structure of this invention is illustrated in the drawings.

FIGURE 1 is a cross-sectional view of a tape made in accordance with this invention in which 10 is a biaxially oriented polypropylene film having a surface 12 activated to receive an adhesive and 14 is a pressure-sensitive adhesive mass coating upon the activated surface.

Figure 2:
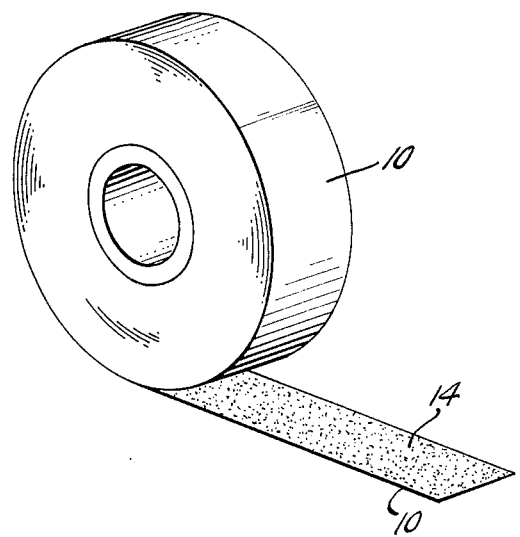

FIGURE 2 is a roll of the tape shown in FIG. 1 wound upon itself in which the adhesive surface of the overlying ply of tape is in contact with the back side, or uncoated surface, of the underlying ply.

The pressure-sensitive adhesive mass is applied to the activated surface of the biaxially oriented polypropylene film. Any of the conventional coating techniques such as knife, direct and reverse roll, transfer coating, and the like may be used. The adhesive may be applied from solvent or from emulsion or aqueous dispersion. Water-based systems are preferred since such systems are safer, more economical and odorless. After application of the mass to the film, the coated backing is dried to remove the solvent or water vehicle. Generally, the adhesive coated film is passed through a drying oven at temperatures of from 150° F. to 210° F. for a period of from about 3 minutes to ½ minute. Temperatures much above 210° F. should be avoided since the film may soften and lose its orientation at such elevated temperatures. After drying the adhesive coated film is wound upon itself in roll form and subsequently is slit to the desired width and wound on cores in the desired length.

The invention is further described by reference to certain preferred embodiments as illustrated in the following examples. It should be understood that the invention should not be limited by the examples since the scope of the invention is as it is defined in the claims.

*Examples 1–9*

The following tabulation will show various interpolymers useful as pressure-sensitive adhesive mass compositions when applied to the electrostatically activated surface of a biaxially oriented polypropylene film.

TABLE I

| Example Number | Parts by Weight of Interpolymer | | | | | | | | |
|---|---|---|---|---|---|---|---|---|---|
| | 1 | 2 | 3 | 4 | 5 | 6 | 7 | 8 | 9 |
| Monomer: | | | | | | | | | |
| 2-ethylhexyl acrylate | 58 | 80 | 90 | 90 | 90 | 77 | 75 | 77 | 78 |
| Vinyl acetate | 42 | 20 | 10 | | | | | 20 | 20 |
| Methacrylic acid | | | | 10 | 5 | 3 | | 3 | |
| Acrylic acid | | | | | 5 | | | | 2 |
| Styrene | | | | | | 20 | 25 | | |

Each of the pressure-sensitive adhesive compositions of Examples 1 through 9 were applied at a coating weight of about 1 ounce per square yard to the electrostatically treated activated surface of a biaxially oriented polypropylene film. The mass compositions of Examples 1 through 8 were applied from a solvent medium, ethyl acetate, and the mass of Example 9 was applied from a water dispersion. The polypropylene film used was obtained from the Kalle Company and is identified by them as V-157 and was 1.6 mils thick and in addition had the following physiial properties:

| Property | Test method | Value |
|---|---|---|
| Tensile: | | |
| Transverse direction | D-882-56T-ASTM | 34,000-39,800 p.s.i. |
| Machine direction | D-882-56T-ASTM | 19,800-25,000 p.s.i. |
| Elongation: | | |
| Transverse direction | D-882-56T-ASTM | 25-35%. |
| Machine direction | D-882-56T-ASTM | 50-70%. |
| Modulus of elasticity: | | |
| Transverse direction | D-1530-58T-ASTM | 355,000 p.s.i. |
| Machine direction | D-1530-58T-ASTM | 240,000 p.s.i. |
| Elmendorf tear: | | |
| Transverse direction | D-1424-59-ASTM | 10-15 gm./mil. |
| Machine direction | D-1424-59-ASTM | 7-10 gm./mil. |
| Tear resistance: | | |
| Transverse direction | D-1004-49T-ASTM | 200-250 gms./mil. |
| Machine direction | D-1004-49T-ASTM | 100-150 gms./mil. |

After coating, the adhesion of the tape of Examples 1–6, 8 and 9 was measured by attaching a one-inch wide sample to a steel panel and measuring the force in ounces necessary to remove the sample from the panel when removing the sample at a 180° angle and at a speed of 12 inches per minute. A further description of this test is given in ASTM-D-1000. The following results were obtained:

| Example No.: | Adhesion to steel (ounces) |
| --- | --- |
| 1 | 45 |
| 2 | 80 |
| 3 | 51 |
| 4 | 37 |
| 5 | 45 |
| 6 | 65 |
| 8 | 45 |
| 9 | 41 |

*Example 10*

A 1.4 mil biaxially oriented polypropylene film (Kalle, V-157) was coated on the film surface which had been activated by corona discharge with a pressure-sensitive adhesive composition comprising an aqueous dispersion (50% solids) of an interpolymer made and sold by Celanese Corporation of America and identified as CL 303, which is believed to be an interpolymer of 2-ethylhexyl acrylate, vinyl acetate, and an acrylic acid in a weight ratio of about 78:20:2, and 10% by weight of said interpolymer solids of sodium polyacrylate (Acrysol GS, sold by Rohm & Haas Chemical Company) as a thickener to facilitate application of the adhesive to the backing. The adhesive was applied to the backing at a weight of about 0.9 ounce per square yard. The Williams plasticity of the adhesive mass measured at 100° F. was 2.59 mm. The adhesive-coated tape was evaluated as follows:

| Property | Test procedure | Result |
| --- | --- | --- |
| Adhesion to steel | ASTM-D-1000 (No further conditioning). | 28.5 oz./inch. |
| Do | ASTM-D-1000 (After aging 6 days at 150° F., 50% relative-humidity). | 18.7 oz./inch. |
| Unwind adhesion | Force necessary to remove tape from a roll thereof at a speed of 150 feet per minute (Not conditioned). | 10.5 oz./inch. |
| Do | Force necessary to remove tape from a roll thereof at a speed of 150 feet per minute. Tape aged for 6 days at 150° F. at 50% relative humidity. | 24.0 oz./inch. |
| Dielectric resistance | ASTM-D-1000 | 7,300 volts/2.5 mils. |

*Example 11*

A 0.75 mil biaxially oriented polypropylene film was coated on the surface which had been electrostatically treated with 0.85 ounce per square yard (dry weight basis) of a 50% solids aqueous dispersion of an interpolymer of 2-ethylhexyl acrylate, vinyl acetate, and an acrylic acid (78:20:2 ratio of monomers by weight). The adhesive-coated sheet was dried and wound up upon itself in roll form. The adhesive coated tape was tacky and pressure-sensitive, had good "quick-stick." The adhesive was securely anchored or united to the backing, and when the tape was unwound it did not offset to the underlying ply. The adhesive tape looked excellent, and was optically clear and transparent.

*Example 12*

A 1.25 mil biaxially oriented polypropylene film which had had a surface thereof treated by corona discharge to activate the surface was coated, on the activated side, with a 50% solids by weight aqueous dispersion of an interpolymer sold by Celanese Corporation of America as CL 303 and believed to be an interpolymer of 2-ethylhexyl acrylate, vinyl acetate, and an acrylic acid in which said monomers are present in said polymer in a weight ratio of 78:20:2, respectively. The polypropylene film used was sold by Union Carbide Corporation as UDEL 2001 and had the following characteristics:

| Property: | Value |
| --- | --- |
| Thickness, mils | 1.25 |
| Tensile strength, p.s.i.: | |
| Machine direction | 30,000 |
| Transverse direction | 27,000 |
| Elongation at break, percent: | |
| Machine direction | 46 |
| Transverse direction | 45 |
| Elmendorf tear, gm./mil: | |
| Machine direction | 7 |
| Transverse direction | 7 |
| Impact strength, gm. | 1,075 |
| Specular gloss/mil. 45 deg. | 84 |
| Specular light transmission, percent | 54 |
| Diffused light haze, percent | <1.8 |

The aqueous dispersion of said interpolymer (CL 303) was thickened with 4 parts per 100 parts of interpolymer solids of water-soluble sodium polyacrylate (Alubrigum #825), sold by Jordan Chemical Company. The thickened dispersion was applied to the activated surface of said biaxially oriented polypropylene film by reverse roll coating and deposited in a dry weight amount of about 1 ounce per square yard of film surface. The adhesive coated film was dried by passing the adhesive-coated film through a four-stage drying oven. The drying temperature in each stage was 150° F., 180° F., 200° F., and 200° F. The adhesive coated film was in each drying zone for about one minute. After drying, the adhesive coated film was wound into a master roll and slit to the desired width. The tape was excellent; the adhesive was firmly anchored to the backing and did not offset or transfer upon unwinding. A sample of the tape, 1-inch wide, was attached to a steel panel and the force required to strip it off at the rate of 12 inches per minute at an angle of 180° (ASTM-D-1000) was 23 ounces.

What is claimed is:

1. A normally tacky and pressure-sensitive adhesive tape wound upon itself in roll form comprising a backing of biaxially oriented film consisting of polypropylene and having a surface which has been activated to improve its anchorage characteristics, and a normally tacky and pressure-sensitive adhesive composition comprising a terpolymer having the following components:

(a) an alkyl ester of acrylic or methacrylic acid,
(b) an unsaturated carboxylic acid, and
(c) vinyl acetate or vinyl butyrate,
wherein component (a) represents from about 55–80 percent of the terpolymer and component (b) represents from about 1–10 percent of the terpolymer;

said adhesive being firmly united to the activated surface of said backing so that the adhesive does not offset during unwinding, and said backing having an edge tear to cross tear ratio of at least 10:1, a tensile strength greater than 18 pounds per inch per mil thickness, and a modulus of 5% elongation which exceeds 12,000 pounds, and said backing being sufficiently resistant to elongation that it does not stretch more than 1.6 times its original length.

2. A normally tacky and pressure-sensitive adhesive tape wound upon itself in roll form as defined in claim 1, wherein said alkyl ester is 2-ethylhexyl acrylate, said unsaturated carboxylic acid is methacrylic acid, and said vinyl acetate or vinyl butyrate is vinyl acetate.

3. A normally tacky and pressure-sensitive adhesive tape wound upon itself in roll form as defined in claim 1, wherein said alkyl ester is 2-ethylhexyl acrylate, said unsaturated carboxylic acid is acrylic acid, and said vinyl acetate or vinyl butyrate is vinyl acetate.

References Cited by the Examiner

UNITED STATES PATENTS

| | | | |
|---|---|---|---|
| Re. 24,906 | 12/1960 | Ulrich | 117—122 |
| 2,575,585 | 11/1951 | Cox et al. | 117—122 |
| 2,947,650 | 8/1960 | Gerhardt et al. | 117—122 |
| 2,953,475 | 9/1960 | Bergstedt et al. | 117—122 |
| 2,969,143 | 1/1961 | De Bell | 117—138.8 |
| 2,998,324 | 8/1961 | Hirt | 117—138.8 |
| 3,022,543 | 2/1962 | Baird et al. | 117—138.8 |
| 3,041,208 | 6/1962 | Hay et al. | 117—138.8 |
| 3,079,278 | 2/1963 | Naudain | 117—122 |
| 3,088,844 | 5/1963 | Hungerford et al. | 117—138.8 |
| 3,144,430 | 8/1964 | Schaffhausen | 117—122 XR |

WILLIAM D. MARTIN, *Primary Examiner.*

MURRAY KATZ, *Examiner.*